United States Patent
Schmidt et al.

(10) Patent No.: US 9,790,004 B1
(45) Date of Patent: Oct. 17, 2017

(54) RETENTION SYSTEM FOR GAS CYLINDER OF EVACUATION SYSTEM

(71) Applicant: GOODRICH CORPORATION, Charlotte, NC (US)

(72) Inventors: Ryan Schmidt, Gilbert, AZ (US); Drew Hartman, Phoenix, AZ (US); William T. Larner, Phoenix, AZ (US); Jesus I. Flores, Goodyear, AZ (US); James Baglini, Jr., Chandler, AZ (US)

(73) Assignee: GOODRICH CORPORATION, Charlotte, NC (US)

( * ) Notice: Subject to any disclaimer, the term of this patent is extended or adjusted under 35 U.S.C. 154(b) by 1 day.

(21) Appl. No.: 15/132,787

(22) Filed: Apr. 19, 2016

(51) Int. Cl.
| | |
|---|---|
| *B64D 25/00* | (2006.01) |
| *F17C 13/08* | (2006.01) |
| *B65D 33/28* | (2006.01) |
| *B64D 25/14* | (2006.01) |
| *B64D 25/18* | (2006.01) |

(52) U.S. Cl.
CPC ............ *B65D 33/28* (2013.01); *B64D 25/00* (2013.01); *B64D 25/14* (2013.01); *B64D 25/18* (2013.01); *F17C 13/084* (2013.01)

(58) Field of Classification Search
CPC ............ F17C 13/084; F17C 2205/0188; F17C 2205/0153; F17C 2205/0157; B64D 25/00
USPC ....................................... 244/118.1; 224/901
See application file for complete search history.

(56) References Cited

U.S. PATENT DOCUMENTS

| | | | | |
|---|---|---|---|---|
| 3,765,635 A | * | 10/1973 | Burrell .................. | F17C 13/084 211/85.18 |
| 3,910,532 A | | 10/1975 | Fischer | |
| 4,055,286 A | * | 10/1977 | Schmid .............. | B60R 11/0205 224/540 |
| 4,109,692 A | * | 8/1978 | Brown .................. | A61M 16/10 215/12.1 |
| 4,143,800 A | * | 3/1979 | McCaffrey ............... | B60N 3/08 224/42.11 |
| D267,227 S | * | 12/1982 | Ziaylek, Jr. .................... | D8/373 |
| 4,375,877 A | | 3/1983 | Shorey | |
| 4,451,016 A | | 5/1984 | Genovese | |
| 4,676,461 A | | 6/1987 | Musselwhite | |
| 5,259,372 A | * | 11/1993 | Gross ....................... | A61G 1/04 128/200.24 |
| 5,511,846 A | * | 4/1996 | Fuller ..................... | B63C 11/02 294/149 |
| 5,887,437 A | * | 3/1999 | Maxim ..................... | A61F 7/10 224/901 |
| 6,073,796 A | * | 6/2000 | Mogil ....................... | A45F 3/16 215/12.1 |

(Continued)

FOREIGN PATENT DOCUMENTS

| | | | | |
|---|---|---|---|---|
| CA | 2348139 A1 | * | 11/2001 | ............. D03D 15/00 |
| GB | 2414066 A | * | 11/2005 | ............ F17C 13/084 |

*Primary Examiner* — Justin Larson
(74) *Attorney, Agent, or Firm* — Snell & Wilmer L.L.P.

(57) ABSTRACT

A retention unit for securing a charged gas cylinder to a body of an aircraft includes a container having an opening and configured to cover the charged gas cylinder. The retention unit also includes a plurality of flaps coupled to the container and configured to be attached to the body of the aircraft using a contact adhesive. The retention unit also includes a drawstring disposed around the opening of the container and configured to provide a closure of the container around a neck of the charged gas cylinder inside the container.

19 Claims, 5 Drawing Sheets

(56) References Cited

U.S. PATENT DOCUMENTS

| | | | | |
|---|---|---|---|---|
| 6,220,557 | B1* | 4/2001 | Ziaylek | A62C 13/78 248/154 |
| 7,198,512 | B1* | 4/2007 | Swiatek | B62J 9/008 224/902 |
| 7,316,435 | B2* | 1/2008 | Leighton | A45C 11/00 150/154 |
| 7,370,660 | B2* | 5/2008 | Hamilton | A61H 3/04 135/66 |
| 7,520,549 | B2* | 4/2009 | Leighton | A45C 11/00 150/154 |
| 7,753,589 | B2* | 7/2010 | Palt | F17C 13/084 150/154 |
| 8,813,343 | B2* | 8/2014 | Smith | B23P 17/04 206/446 |
| 9,205,782 | B2* | 12/2015 | Byham | B60R 7/043 |
| 9,321,404 | B1* | 4/2016 | Mellenthin | B60R 7/043 |
| 2001/0049245 | A1* | 12/2001 | Soar | D03D 15/00 442/135 |
| 2008/0050051 | A1* | 2/2008 | Palt | F17C 13/084 383/41 |
| 2008/0073355 | A1* | 3/2008 | Akbar | B65D 29/00 220/562 |
| 2008/0190947 | A1* | 8/2008 | Bourgraf | F17C 13/084 220/737 |
| 2014/0191505 | A1 | 7/2014 | MacNeal et al. | |
| 2014/0224252 | A1 | 8/2014 | Martin et al. | |
| 2016/0137136 | A1* | 5/2016 | Mellenthin | B60R 7/043 224/275 |
| 2016/0272337 | A1* | 9/2016 | McBurnett | B64D 37/04 |

\* cited by examiner

RETENTION SYSTEM FOR GAS CYLINDER OF EVACUATION SYSTEM

FIELD

The present disclosure is directed to retention systems for use in fuselages of aircraft and, more particularly, to retention units designed to provide support to gas cylinders mounted to a structure within the aircraft fuselage.

BACKGROUND

Fuselage mounted evacuation systems of aircraft typically use a charged gas cylinder that may be mounted to a packboard or structure within the aircraft fuselage or belly fairing. The gas cylinder provides air for life rafts, slides, or other floats to be used in evacuation situations.

SUMMARY

Described herein is a secondary retention unit for securing a gas cylinder to a body of an aircraft or packboard or structure within the aircraft fuselage or belly fairing. The retention unit includes a container having an opening and configured to cover the gas cylinder. The retention unit also includes a plurality of flaps coupled to the container and configured to be attached to the body of the aircraft using a contact adhesive. The retention unit also includes a drawstring disposed around the opening of the container and configured to provide a closure of the container around a neck of the gas cylinder inside the container.

In any of the foregoing embodiments, the container of the retention unit is made of a fabric.

In any of the foregoing embodiments, the plurality of flaps of the retention unit are made of the same fabric as the container.

In any of the foregoing embodiments, the retention unit is secured to the body of the aircraft by at least one clamp attached to the body of the aircraft, the at least one clamp wrapping around an exterior of the container.

In any of the foregoing embodiments, the plurality of flaps of the retention unit are permanently attached to the body of the aircraft by the contact adhesive.

In any of the foregoing embodiments, the plurality of flaps of the retention unit are disposed along a length of the container and extend radially from the container.

In any of the foregoing embodiments, a value of the gas cylinder extends out of the opening of the container.

In any of the foregoing embodiments, the gas cylinder of the retention unit is configured to provide air for an evacuation system.

Also described is a gas cylinder retention assembly. The gas cylinder retention assembly includes a structure coupled to a body of an aircraft. The gas cylinder retention assembly also includes a container made of a fabric having an opening and configured to cover a gas cylinder. The gas cylinder retention assembly also includes a plurality of flaps coupled to the container and configured to be attached to the structure using a contact adhesive. The gas cylinder retention assembly also includes a drawstring disposed around the opening of the container and configured to provide a closure of the container around a neck of the gas cylinder inside the container.

In any of the foregoing embodiments, the plurality of flaps of the gas cylinder retention assembly are made of the fabric.

In any of the foregoing embodiments, the container of the gas cylinder retention assembly is additionally secured to the structure by at least one clamp attached to the structure, the at least one clamp wrapping around an exterior of the fabric container.

In any of the foregoing embodiments, the plurality of flaps of the gas cylinder retention assembly are permanently attached to the structure by the contact adhesive.

In any of the foregoing embodiments, the plurality of flaps of the gas cylinder retention assembly are disposed along a length of the container and extend radially from the container.

In any of the foregoing embodiments, a value of the gas cylinder extends out of the opening of the container.

In any of the foregoing embodiments, the gas cylinder of the gas cylinder retention assembly is configured to provide air for an evacuation system.

Also described is a method for installing a gas cylinder retention assembly to a body of an aircraft. The method includes attaching, to the body of the aircraft using a contact adhesive, a plurality of flaps coupled to a container having an opening. The method also includes placing a gas cylinder inside the container through the opening. The method also includes drawing closed a drawstring disposed around the opening of the container, the drawstring providing a closure of the container around a neck of the gas cylinder inside the container.

In any of the foregoing methods, the container of the gas cylinder retention assembly is made of a fabric.

In any of the foregoing methods, the plurality of flaps of the gas cylinder retention assembly are made of the same fabric as the container of the gas cylinder retention assembly.

In any of the foregoing methods, the method also includes wrapping at least one clamp attached to the body of the aircraft around an exterior of the container and tightening the clamp such that the container and the gas cylinder within are securely held.

In any of the foregoing methods, the plurality of flaps of the gas cylinder retention assembly are permanently attached to the body of the aircraft using the contact adhesive.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosures, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the disclosure, it should be understood that other embodiments may be realized and that logical, chemical, and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Figure 1:
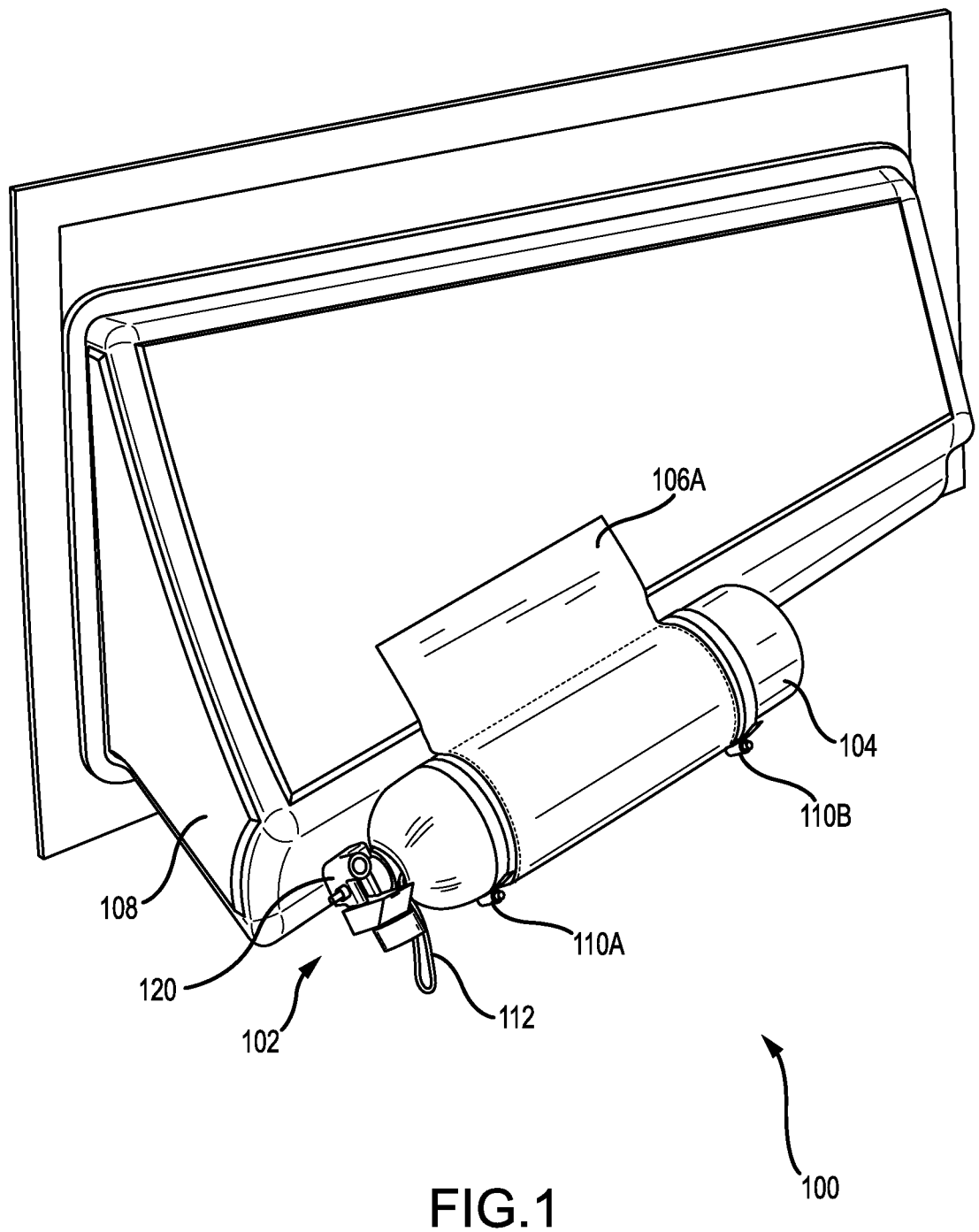
FIG. 1 is a drawing of a retention system mounted to a structure, in accordance with various embodiments.

Turning now to FIG. 1, a gas cylinder retention assembly (or system) 100 is shown. The gas cylinder retention assembly 100 may be used as part of a fuselage mounted evacuation system of an aircraft, which may use a charged gas cylinder 102. The charged gas cylinder 102 is configured to provide air for life rafts, slides, or other floats to be used in evacuation situations.

In many situations, it is important to create redundancy in the gas cylinder retention assembly 100, as the charged gas cylinder 102 may be located in a compartment of the fuselage located near aircraft hydraulic and/or electrical lines, and any movement of the charged gas cylinder 102 may cause damage to other important systems within the aircraft. The gas cylinder retention assembly 100 includes a container 104. In various embodiments, the container is made of one or more fabrics and resembles a bag. In various embodiments, the fabric includes cotton canvas, nylon, polyester, or a fabric made of aramid or para-aramid fibers. Fabric may have a high tensile strength relative to its thickness. In various embodiments, a fabric with a particularly high tensile strength is used to support the weight of the charged gas cylinder 102. The container 104 covers substantially all the charged gas cylinder 102, leaving valve 120 of the charged gas cylinder 102 exposed.

The gas cylinder retention assembly 100 includes multiple flaps 106A-106B (flap 106B not shown in FIG. 1). The flaps 106A-106B are coupled to the container 104. In various embodiments, the flaps 106A-106B are made of the same material as the container 104. In various embodiments, the flaps 106A-106B are part of a single piece of material wrapping around a portion of the container 104. In various embodiments, the flaps 106A-106B do not wrap around the container 104 and are attached at a location where each flap meets the container 104. In various embodiments, a contact adhesive is used to couple the flaps 106A-106B to the container 104. In various embodiments, the flaps 106A-106B are sewn on to the container 104 using a high strength thread. The flaps 106A-106B are each disposed along a length of the container 104. In various embodiments, the flaps 106A-106B are located between clamps 110A-110B.

The flaps 106A-106B are attached to a structure 108. In various embodiments, the structure 108 is a packboard or structure within the aircraft fuselage or belly fairing. In various embodiments, the structure 108 is a surface of the fuselage of the airplane. In various embodiments, the packboard is made of a woven glass epoxy composite or carbon epoxy composite material.

The clamps 110A-110B are attached to the structure 108 and are configured to wrap around the outside of the container 104. The clamps 110A-110B attached to the structure 108 or the container 104 with the flaps 106A-106B attached to the structure 108 may individually provide enough strength and security to reliably support the charged gas cylinder 102 and keep it in place. However, using both the clamps 110A-110B and the container 104 with the flaps 106A-106B together enhances the probability that the charged gas cylinder 102 will remain in place within the fuselage of the airplane. When used together, in a case of a malfunction or incorrect installation of the clamps 110A-110B, using a fabric with high tensile strength results in the container 104 and the flaps 106A-106B being able to support the weight of the charged gas cylinder 102 without the support of the clamps 110A-110B.

The container 104 also includes a drawstring 112. The drawstring 112 allows the charged gas cylinder 102 to be secured in the container 104 by drawing the drawstring 112 closed around a neck of the charged gas cylinder 102.

Figure 2:
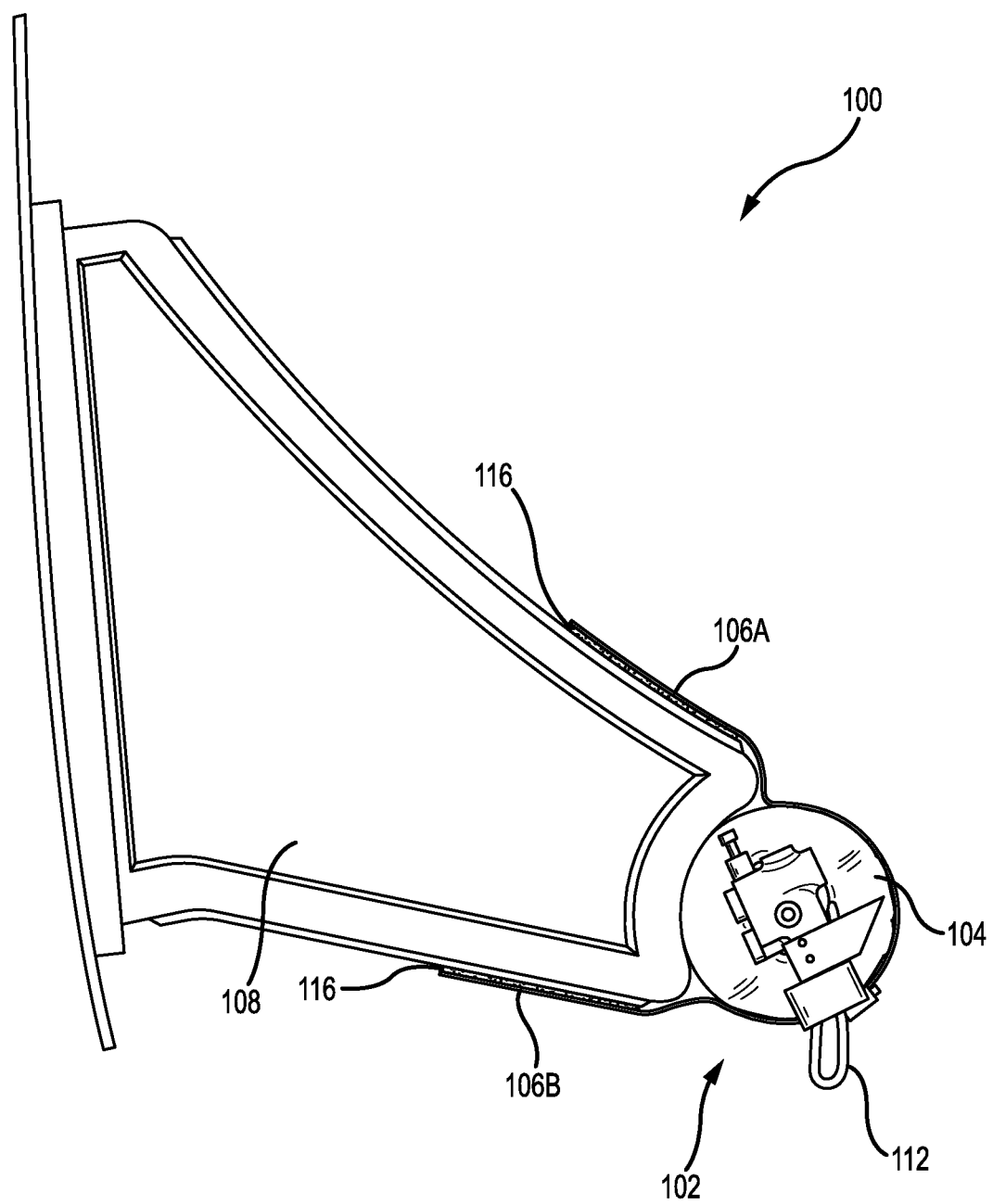
FIG. 2 is a drawing of a retention system mounted to a structure, in accordance with various embodiments.

Referring now to FIG. 2, the gas cylinder retention assembly 100 is shown in an axially angled view. The charged gas cylinder 102, container 104, flaps 106A-106B, structure 108, and drawstring 112 are also shown.

The flaps 106A-106B are attached to the structure 108 using a contact adhesive 116. The contact adhesive 116 forms a permanent bond between the flaps 106A-106B and the structure 108. In various embodiments, the contact adhesive 116 is a contact adhesive used to bond fabric to fabric. In various embodiments, the contact adhesive 116 creates a permanent bond between the flaps 106A-106B and the structure 108 based on a chemical reaction between the fabric of the flaps 106A-106B, the epoxy composite material of the structure 108, and the properties of the contact adhesive 116.

By using the contact adhesive 116, a lower profile may be achieved, as compared to using screws or hooks to connect the flaps 106A-106B to the structure 108. The lower profile may be important within a tight space without room for extraneous elements. Further, achieving the lower profile reduces risk of damage to other components in a situation where another component becomes loose and makes contact with the gas cylinder retention assembly 100. The flaps 106A-106B may be spaced apart on the container 104 by a distance based on the features of the structure 108. In various embodiments, the structure 108 provides a curved groove corresponding to the dimensions of the charged gas cylinder 102.

Figure 3:
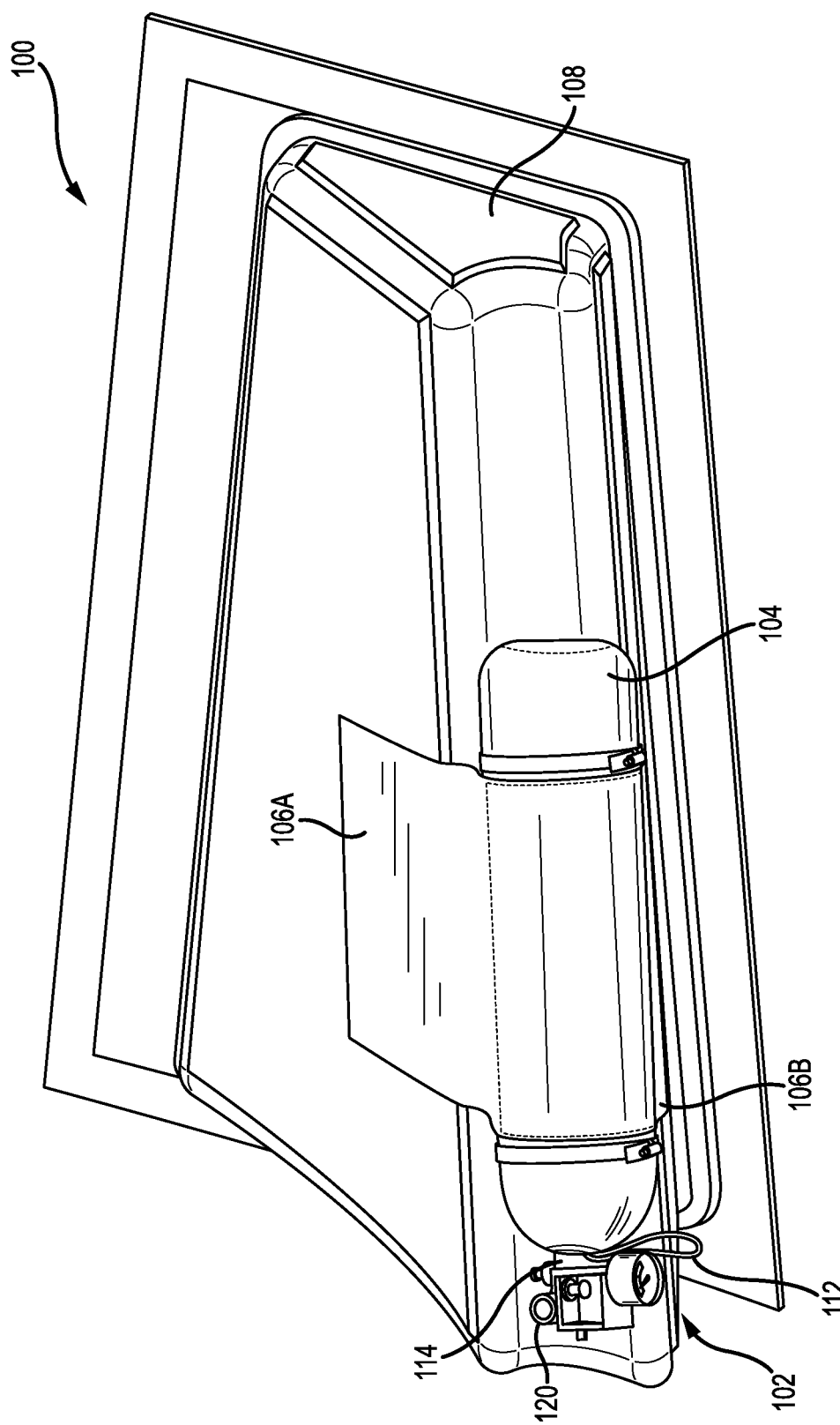
FIG. 3 is a drawing of a retention system mounted to a structure, in accordance with various embodiments.

Referring now to FIG. 3, the gas cylinder retention assembly 100 is shown in a side view. The charged gas cylinder 102, container 104, flaps 106A-106B, structure 108, clamps 110A-110B, and drawstring 112 are also shown.

The container 104 covers substantially all of the body of the charged gas cylinder 102. The container 104 also covers the bottom of charged gas cylinder 102. The container also includes a drawstring 112. The drawstring 112 allows the charged gas cylinder 102 to be secured in the container 104 by drawing the drawstring 112 closed around a neck 114 of the charged gas cylinder 102. The drawstring 112 may be made of any strong woven material, such as nylon.

A valve 120 may project out the container 104 so that connections may be made to the charged gas cylinder 102 without removal of the charged gas cylinder 102 from the container 104. The container 104 may be created specifically for the dimensions of the charged gas cylinder 102, in order for the charged gas cylinder 102 to fit snugly and securely within the container 104. Movement of the charged gas cylinder 102 within the container 104 is not desirable. Further, excess fabric resulting from the container 104 being too large for the charged gas cylinder 102 may result in a poor fit in response to securing the clamps 110A-110B. Parts of the container 104 may be woven together using a high strength thread, such as nylon thread, and using a secure technique, such as starting with a backstitch and ending with a backstitch.

While the charged gas cylinder 102 and the container 104 are shown in FIGS. 1-3 as being in a horizontal configuration such that an axis along a length of the container 104 is horizontal, any configuration may be used and the benefits described herein may be achieved. For example, the charged gas cylinder 102 and the container 104 may be in a vertical configuration such that the axis along the length of the container 104 is vertical. The gas cylinder retention assembly 100 still provides for stability of the charged gas cylinder 102 within the container 104 even in a vertical configuration. In various embodiments, the opening of the container 104 is located above the closed bottom of the container in a vertical configuration. In such embodiments, the closed bottom of the container 104 may support the weight of the charged gas cylinder 102. In various embodiments the opening of the container 104 may be located below the closed bottom of the container in the vertical configuration, with the drawstring 112 drawn closed and secured providing the support for the weight of the charged gas cylinder 102.

Figure 4:
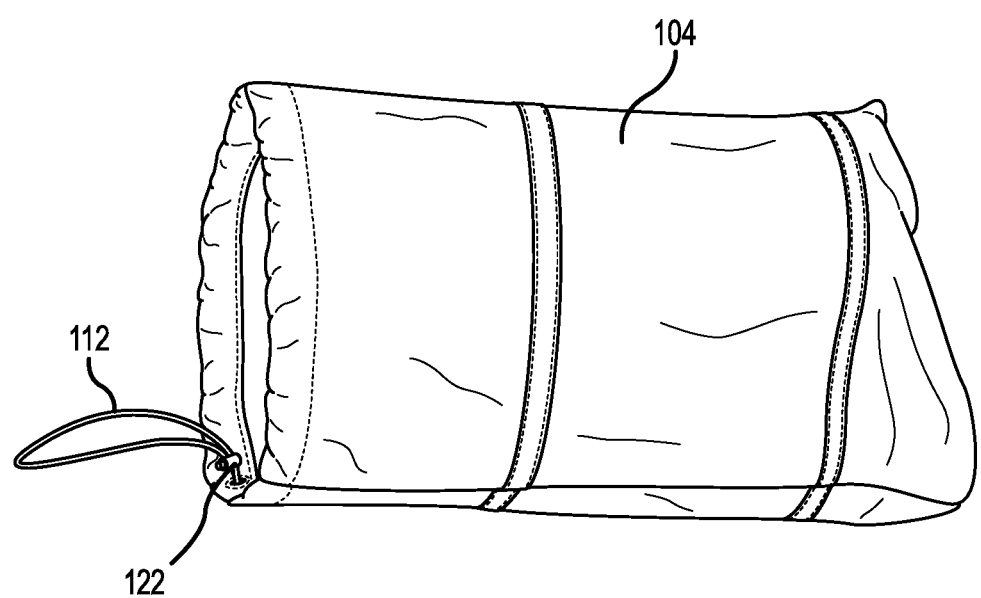
FIG. 4 is a drawing of a container of a retention system, in accordance with various embodiments.

Referring now to FIG. 4, container 104 is shown. As described herein, the container 104 may be made of fabric such as cotton canvas, nylon, polyester, or a fabric made of aramid or para-aramid fibers. In various embodiments, a fabric with a high tensile strength is used. The container 104 may be created specifically for the dimensions of the charged gas cylinder 102, in order for the charged gas cylinder 102 to fit snugly and securely within the container 104. The drawstring 112 may be loosened to allow for placement of the charged gas cylinder 102 into the container 104 and may be drawn closed around the neck 114 of the charged gas cylinder 102 such that the charged gas cylinder 102 is secure within the container 104. The drawstring may be tied with a particular secure knot, or secured with a clasp 122.

The gas cylinder retention assembly 100 may include a gas cylinder retention unit and the structure 108. The gas cylinder retention unit may be a part of the gas cylinder retention assembly 100 and includes the container 104, the flaps 106A-106B, and the drawstring 112. In various embodiments, the gas cylinder retention unit also includes clamps 110A-110B.

Figure 5:
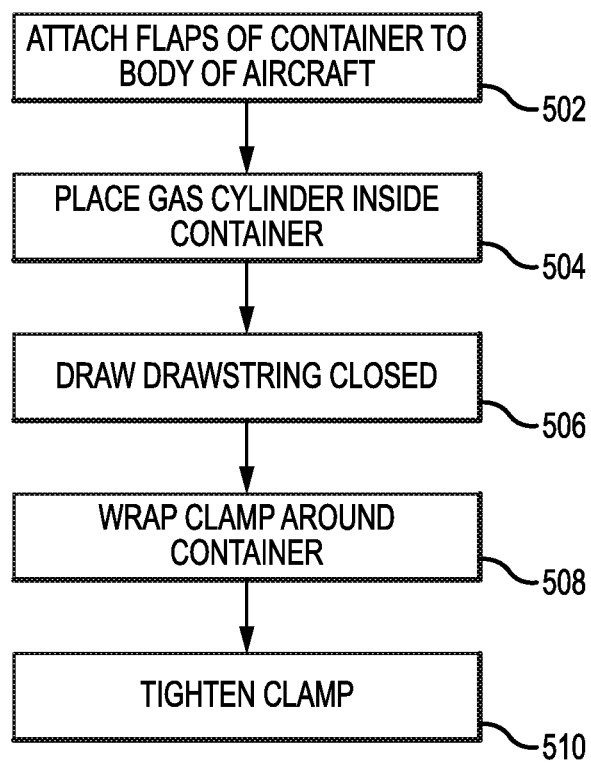
FIG. 5 is a flowchart describing the steps of installing a retention system, in accordance with various embodiments.

Referring now to FIG. 5, a method 500 for installing the gas cylinder retention assembly 100 is shown. In block 502, flaps 106A-106B are attached to the structure 108 of the aircraft. The flaps 106A-106B are coupled to the container 104 along the length of the container 104 and extending radially from the container 104. The flaps 106A-106B are permanently attached to the structure 108 using a contact adhesive 116. The flaps 106A-106B are made of the same fabric as the container 104.

In block 504, the charged gas cylinder 102 is placed inside the container 104. In various embodiments, the charged gas cylinder 102 provides air for an inflatable device in an evacuation situation. At this point, the charged gas cylinder 102 is held against the structure 108 by the container 104 and the flaps 106A-106B.

In block 506, the drawstring 112 of the container 104 is drawn closed around the neck 114 of the charged gas cylinder 102. At this point, the charged gas cylinder 102 is held against the structure 108 such that it has limited movement in a Y-axis and is secured by the drawstring such that it has limited movement in an X-axis.

In block 508, the clamps 110A-110B are wrapped around the outside of the container 104. The clamps 110A-110B are attached to the structure 108 of the airplane fuselage.

In block 510, the clamps 110A-110B are tightened around the container 104. The clamps 110A-110B provide further support for the charged gas cylinder to be held in place within the fuselage of the airplane. In various embodiments, the clamps 110A-110B are tightened according to a value calibrated specifically for the charged gas cylinder 102 and the container 104.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A retention assembly for securing a charged gas cylinder to an aircraft, the retention assembly comprising:
   a body structure of the aircraft;
   a container having an opening and configured to cover the charged gas cylinder;
   a plurality of flaps coupled to the container and attached to the body structure of the aircraft using a contact adhesive; and
   a drawstring disposed around the opening of the container and configured to provide a closure of the container around a neck of the charged gas cylinder inside the container.

2. The retention assembly of claim 1, wherein the container is made of a fabric.

3. The retention assembly of claim 1, wherein the container and the plurality of flaps are made of a fabric.

4. The retention assembly of claim 1, wherein the retention unit is further secured to the body structure of the aircraft by a clamp attached to the body structure of the aircraft, the at least one clamp wrapping around an exterior of the container.

5. The retention assembly of claim 1, wherein the plurality of flaps are permanently attached to the body structure of the aircraft by the contact adhesive.

6. The retention assembly of claim 1, wherein each of the plurality of flaps are disposed along a length of the container and extend radially from the container.

7. The retention assembly of claim 1, wherein a valve of the charged gas cylinder extends out of the opening of the container.

8. The retention assembly of claim 1, wherein the charged gas cylinder is configured to provide air for an evacuation system.

9. A gas cylinder retention assembly comprising:
   a body structure of an aircraft;
   a container made of a fabric having an opening and configured to cover a charged gas cylinder;
   a plurality of flaps coupled to the container and configured to be attached to the body structure using a contact adhesive; and
   a drawstring disposed around the opening of the container and configured to provide a closure of the container around a neck of the charged gas cylinder inside the container;
   wherein the container is additionally secured to the body structure by at least one clamp attached to the body structure, the at least one clamp wrapping around an exterior of the container.

10. The gas cylinder retention assembly of claim 9, wherein the plurality of flaps are made of the same fabric as the container.

11. The gas cylinder retention assembly of claim 9, wherein the plurality of flaps are permanently attached to the body structure by the contact adhesive.

12. The gas cylinder retention assembly of claim 9, wherein each the plurality of flaps are disposed along a length of the container and extend radially from the container.

13. The gas cylinder retention assembly of claim 9, wherein a valve of the charged gas cylinder extends out of the opening of the container.

14. The gas cylinder retention assembly of claim 9, wherein the charged gas cylinder is configured to provide air for an evacuation system.

15. A method for installing a gas cylinder retention assembly to a body structure of an aircraft, comprising:
   attaching, to the body of the aircraft using a contact adhesive, a plurality of flaps coupled to a container having an opening;
   placing a charged gas cylinder inside the container through the opening; and
   drawing closed a drawstring disposed around the opening of the container, the drawstring providing a closure of the container around a neck of the charged gas cylinder inside the container.

16. The method of claim 15, wherein the container is made of a fabric.

17. The method of claim 15, wherein the container and the plurality of flaps are made of a fabric.

18. The method of claim 15, further comprising:
   wrapping a clamp attached to the body structure of the aircraft around an exterior of the container; and
   tightening the clamp such that the container and the charged gas cylinder within are securely held.

19. The method of claim 15, wherein the plurality of flaps are permanently attached to the body structure of the aircraft using the contact adhesive.

* * * * *